(12) United States Patent
Sirkett et al.

(10) Patent No.: US 10,518,406 B2
(45) Date of Patent: Dec. 31, 2019

(54) COMPONENT FEEDER AND A SYSTEM FOR PICKING COMPONENTS COMPRISING THE COMPONENT FEEDER

(71) Applicant: ABB Schweiz AG, Baden (CH)

(72) Inventors: Daniel Sirkett, Västerås (SE); Peter Fransson, Västerås (SE)

(73) Assignee: ABB Schweiz AG, Baden (CH)

( * ) Notice: Subject to any disclaimer, the term of this patent is extended or adjusted under 35 U.S.C. 154(b) by 54 days.

(21) Appl. No.: 15/756,419

(22) PCT Filed: Sep. 17, 2015

(86) PCT No.: PCT/EP2015/071289
§ 371 (c)(1),
(2) Date: Feb. 28, 2018

(87) PCT Pub. No.: WO2017/045716
PCT Pub. Date: Mar. 23, 2017

(65) Prior Publication Data
US 2018/0250810 A1   Sep. 6, 2018

(51) Int. Cl.
| | | |
|---|---|---|
| G06F 7/00 | (2006.01) | |
| B25J 9/00 | (2006.01) | |
| G01B 11/26 | (2006.01) | |
| G01G 19/414 | (2006.01) | |
| G01G 19/52 | (2006.01) | |
| G01B 11/00 | (2006.01) | |

(Continued)

(52) U.S. Cl.
CPC .......... B25J 9/0093 (2013.01); B25J 9/1697 (2013.01); G01B 11/002 (2013.01); G01B 11/26 (2013.01); G01G 19/414 (2013.01); G01G 19/52 (2013.01); H04N 1/1008 (2013.01); G05B 2219/37555 (2013.01)

(58) Field of Classification Search
None
See application file for complete search history.

(56) References Cited

U.S. PATENT DOCUMENTS

| | | | |
|---|---|---|---|
| 4,608,646 A | 8/1986 | Goodrich et al. | |
| 4,876,728 A | 10/1989 | Roth | |

(Continued)

FOREIGN PATENT DOCUMENTS

| | | | | |
|---|---|---|---|---|
| EP | 0847838 A2 | 6/1998 | | |
| EP | 1518648 A2 * | 3/2005 | ............ | B25J 9/1664 |

(Continued)

OTHER PUBLICATIONS

International Search Report & Written Opinion of the International Searching Authority Application No. PCT/EP2015/071289 Completed Date: Jun. 1, 2016; dated Jun. 8, 2016 10 pages.

*Primary Examiner* — Yolanda R Cumbess
(74) *Attorney, Agent, or Firm* — Whitmyer IP Group LLC

(57) ABSTRACT

A component feeder including a stationary picking surface for receiving components to be picked, a vision system including an image unit arranged to take images of components distributed on the picking surface and a load device including one or more load sensors adapted to detect the presence of a component on the picking surface and the vision system is configured to automatically trigger the image unit to take an image upon detecting the presence of the component on the picking surface.

20 Claims, 2 Drawing Sheets

(51) Int. Cl.
*H04N 1/10* (2006.01)
*B25J 9/16* (2006.01)

(56) References Cited

U.S. PATENT DOCUMENTS

| | | | |
|---|---|---|---|
| 5,280,170 | A | 1/1994 | Baldwin |
| 6,002,125 | A | 12/1999 | Schubert |
| 6,046,462 | A | 4/2000 | Yokajty et al. |
| 2004/0092001 | A1* | 5/2004 | Bedingham ............ C12M 23/04 435/286.2 |
| 2007/0181644 | A1* | 8/2007 | Ueno ...................... H01L 24/81 228/101 |
| 2014/0267691 | A1* | 9/2014 | Humphrey .............. G06T 7/001 348/125 |
| 2018/0049352 | A1* | 2/2018 | Matsumoto .......... H05K 13/022 |

FOREIGN PATENT DOCUMENTS

| | | |
|---|---|---|
| EP | 1518648 A2 | 3/2005 |
| EP | 2221152 A1 | 8/2010 |
| GB | 2177290 A | 1/1987 |
| GB | 2356699 A | 5/2001 |
| WO | 2013113535 A1 | 8/2013 |

* cited by examiner

COMPONENT FEEDER AND A SYSTEM FOR PICKING COMPONENTS COMPRISING THE COMPONENT FEEDER

TECHNICAL FIELD

The present invention relates to a component feeder comprising a picking surface for receiving components to be picked, and a vision system including an image unit arranged to take images of components distributed on the picking surface, and the vision system is configured to locate the components distributed on the picking surface based on the images from the image unit. The present invention also relates to a system for picking components comprising a component feeder and an industrial robot configured to pick components from the component feeder.

BACKGROUND

In automated industrial systems, such as production lines, where for example industrial robots are used, components stored in a disordered bulk storage are required to be fed as individual components in order for various operations to be performed. There exist many feeding devices using different principles and which are suitable for different specific tasks. One type of feeder is a type in which randomly oriented components are fed onto and displayed on a picking surface. An image processing system is typically used in order to determine which components on the picking surface are correctly oriented in order to be pickable by the robot. These types of feeders are flexible since they are not limited to a certain type of component.

According to prior art, the image processing system makes use of a camera that is mounted directly overhead of the picking surface. The camera takes images of the components dispersed on the picking surface and these images are used in robot-vision software to direct a robot gripper to the components to be picked. From U.S. Pat. No. 4,876,728 is known a microprocessor based vision system that includes an overhead camera and two overhead light sources arranged over a conveyor belt, which system is interfaced with a robot system.

From WO2013/113535 is known a component feeder having a bulk storage container, inside which a lift is arranged. The lift has a lift platform that lifts components up from the container and disperses them onto a picking surface, located above the container. A vision system comprising an overhead camera is arranged over the picking surface, and an image is used to determine which components are correctly oriented to be pickable by a robot tool. The picking surface may be transparent and it may be provided with a backlight arrangement comprising a light source arranged underneath the transparent picking surface.

U.S. Pat. No. 6,002,125 discloses an optical device possessing light-sensitive COD-contact sensors for determining the position of components on a conveyor belt moving relative to the sensors. Light sources illuminating the conveyor belt are positioned along at least one scanning line and they lights across the direction of movement of the conveyor belt. The COD-contact sensors are arranged underneath the conveyor belt and the light source illuminates the conveyor belt from above. The contact sensors are mounted straight beneath at the underside of a fixedly mounted transparent glass plate, above which the conveyor belt slides across at the smallest possible pace. At least one row of light-sensitive sensors along the scanning line is set to register the light radiance generated by the items passing between the light source and the sensors. The sensors can be settled on the side of a transparent conveyor belt at a distance from the light source to register the shadow cast by the items passing.

A trend in automation is towards collaborative human-robot assembly. A number of new small robots designed specifically for this mode of working have been launched in recent years, but developments in the field of material handling to support these robots has been slow by comparison. Conveyor belts provide one solution, but in compact lines, a more common solution is hand-to-hand transfer of the objects. In this approach, parts and work pieces are placed by one operator into a designated output-buffer area from where they can be picked up by the operator at the neighboring station. While it is easy for a human to pick up randomly-placed components from the input buffer, a robot requires a vision system for this task.

Existing methods for locating components passed by a human operator to the material input buffer of a robot require the use of either an overhead vision system or a fixture. Both approaches involve extra set up effort and hardware outlays. If an overhead camera is used, then this must be calibrated and installed on a robust mounting to avoid position errors due to external disturbances. Further, images generated by a conventional camera suffers from perspective effects which produce further position-dependent distortions. Another disadvantage with an overhead camera is that some part of the robot arm may block the camera view or cast shadows when an image is taken.

External lighting may also be required depending on the application. Skill is also required in the programming of the vision job itself. Furthermore, when programming the movement cycle of the robot, great care must be taken to ensure that the robot neither blocks the view of the camera nor casts shadows from the lighting at the point in time when an image is taken. This complicates the task of programming the robot, impacts on cycle-time, and increases integration effort.

Alternatively, a camera can be mounted on the robot hand. If a hand-mounted camera is used to locate parts on the input buffer, then this will also incur a cycle-time penalty. The use of fixtures in order to avoid the need for a vision-system places extra demands on the human operator which can also impact overall cycle time. Furthermore, engineering effort is required to design and install the fixture, which both increases system cost and reduces flexibility. Using a fixture can also be a disadvantage as shape of the components to be picked may vary.

Skill is also required in the programming of the vision job itself. Furthermore, when programming the movement cycle of the robot, great care should be taken to ensure that the robot neither blocks the view of the camera nor casts shadows from the lighting at the point in time when a picture is taken. This complicates the task of programming the robot, impacts on cycle-time, and increases integration effort. If a hand-mounted camera is used to locate parts on the input buffer, then this will also incur a cycle-time penalty. The use of fixtures in order to avoid the need for a vision-system places extra demands on the human operator which can also impact overall cycle time. Moreover, engineering effort is required to design and install the fixture, which both increases system cost and reduces flexibility. Fixtures are non-adjustable devices and are thus not practical to use as the items on a component feeder can be various in shape and size. Finally, if a camera is installed on the robot itself, this also makes it slow to localize the components and accordingly the cycle time becomes slower.

SUMMARY

The object of the present invention is to alleviate at least some of the above mentioned problems and to provide a component feeder suitable for human-to-robot transfer of randomly-oriented components.

According to one aspect of the invention, this object is achieved by a component feeder as defined in claim 1.

The component feeder comprises a picking surface for receiving components to be picked and a vision system including an image unit arranged to take images of components distributed on the picking surface and a load device including one or more load sensors adapted to detect the presence of a component on the picking surface and the vision system is configured to automatically trigger the image unit to take an image upon detecting the presence of a component on the picking surface.

According to the invention, the component feeder is equipped with a load device including one or more load sensors, whose purpose is to trigger the image unit as soon as components are placed onto the picking surface. The load sensor is, for example, a pressure sensor. The component feeder according to the invention detects the presence of a component on the picking surface, and automatically triggers the image unit to take an image upon detecting the presence of the component. The images of the components on the picking surface can be used to determine the localization of the components on the picking surface to enable a robot to pick the components.

When the image is taken, the vision system is configured to provide the robot with information about the location of the component(s) on the picking surface. For example, the vision system can be configured to determine the position and orientation of the component(s) distributed on the picking surface, and to provide a robot controller with information about the position and orientation of the component(s). Alternatively, the vision system sends the images to the robot controller, and the position and orientation of the component is determined by the robot controller. When the robot controller receives information about the location of the components to be picked, the necessary motions of the robot for picking the component is calculated, and the robot is ordered to pick the component.

The component feeder according to the invention makes it possible for a human to place components in a randomly-oriented manner and in an arbitrary rate on the picking surface, and the robot is provided with information about the location of the components to be picked when it is detected that a component is present on the picking surface.

An advantage with the present invention is that the vision job can be automatically generated without any intervention by an operator. As the image unit is triggered automatically by detection of the weight of the component on the picking surface, programming effort is reduced since the program does not require any program code to initiate the image taking.

Another advantage with the present invention is that the cycle time can be reduced. While the robot is performing its assembly task, the vision system can work in the background to find the next component to be picked up. Therefore, as soon as the robot needs the next component, it can immediately go to pick it up. By contrast, if the part is found using a handheld camera, the robot path would need always to include a pass above the input buffer area and a momentary stop to take the image.

The load device is configured to measure the load on the picking surface in order to detect when a component is has been positioned on the picking surface. The vision system is configured to detect when a component has been fed to the picking surface based on the measured load. For example, the vision system is configured to detect when a component has been fed to the picking surface by detecting a change in the measured load on the picking surface. For example, a component is detected on the picking surface when the load is above a defined limit value.

The component feeder according to the invention is not limited to be used for human-to-robot transfer of randomly-oriented components. The component feeder according to the invention can, for example, be used together with another mechanical feeder, such as a conveyer, which feeds the picking surface with components.

To allow measurements of the load of the components on the he picking surface, the picking surface should be is stationary, which means that the picking surface does not move relative to the environment, in contrary to a moving conveyor belt. An advantage with a stationary picking surface is that it can be integrated into a material input buffer.

According to an embodiment of the invention, the load sensor is adapted to measure the weight of the components placed on the picking surface. The load device can also be used to measure the weight of components placed onto the picking surface in order to provide additional information regarding e.g. the number of components present on the picking surface.

According to an embodiment of the invention, the picking surface is transparent and the image unit is located underneath the picking surface. Preferably, the light source is also located underneath the picking surface. The component feeder is equipped with an image unit of the type that takes images from underneath a transparent surface. An advantage with this embodiment is that hardware integration effort is reduced due to the fact that overhead lighting and cameras do not need to be installed above the picking surface. Further, robot and vision programming effort are reduced, since it is no longer necessary to ensure that the robot does not block the field of view of the camera and the light while the image is taken.

According to an embodiment of the invention, the vision system comprises an image scanner. An image scanner, is a device that optically scans 3D objects, and converts them to a digital image. Preferably, the image scanner is a 2D scanner. Using a scanner instead of a camera to take images of the components on the picking surface provides several advantages, such as better image quality due to the fact that the images are free from camera perspective errors, reflections and shadows which may introduce position-dependent distortions is avoided, and training of the vision job is easier since the overall component image does not change. As the scanner is triggered automatically by detection of the weight of the part on its surface, the program does not even require any program code to initiate a scan. Furthermore, if the scanner can self-train based on a single target image, no vision-job effort is required either.

According to an embodiment of the invention, the image scanner comprises a contact image sensor (CIS) scanner system. If CIS-type image sensors are used in the scanner, then the scanned image is a true orthogonal projection of the object above the transparent picking surface, whereas the image produced by a conventional camera suffers from perspective effects which produce variation in the 2D image of a 3D object as a function of its position in the focus-plane.

According to an embodiment of the invention, the image scanner comprises a movable image unit, such as a light sensor array, and a movable light source. Thus, overhead lighting and cameras do not need to be installed, and it is no longer necessary to ensure that the robot does not block the field of view of the camera and the lights while the picture is taken.

According to an embodiment of the invention, the image scanner comprises a glass plate and the picking surface is an upper surface of said glass plate. Thus, the picking surface is a part of the scanner. Preferably, the image scanner is a flat-bed scanner and the picking surface is part of the flat-bed scanner. This provides a small and compact component feeder.

According to an embodiment of the invention, the vision system comprises an image processing module configured to determine the locations of the components based on the images of the components distributed on the picking surface. Thus, the component feeder is equipped with an image processing module for interpreting the images. For example, the image processing module is configured to determine the position and orientation of the component(s). In this embodiment the localization of the component in integrated into the component feeder itself. The component feeder is configured to provide the robot controller with information about localization, e.g. the position and orientation of the component(s).

According to an embodiment of the invention, the image processing module is embedded in the image scanner. Thus, the component localization is integrated into the image scanner. Thus, it is not necessary to have an external computer for execution of the vision program.

According to an embodiment of the invention, said one or more load sensors are disposed underneath the image scanner so that the one or more load sensors measure the weight of the image scanner as well as the components on the picking surface. This is a suitable location of the load sensors since they are easy to install.

According to another embodiment of the invention, the one or more load sensors are disposed underneath the glass plate including the picking surface so that the one or more load sensors measure the weight of the glass plate as well as the components on the picking surface.

Suitably, the number of sensors is more than three. For example, three or four sensors can be used. By using more than three sensors, the measuring is improved.

According to an embodiment of the invention, said one or more load sensors are strain gauge sensors. Strain gauge sensors are simple to use and cheap to buy.

According to an embodiment of the invention, the component feeder comprises a conveyer arranged to feed components to the picking surface, and the component feeder is configured to stop the conveyer after the load device has detected the presence of a predetermined number of components on the picking surface. Here, the component feeder is used to receive components that are fed from a conveyor. In this case, the load-sensor is used to stop the conveyor after a predetermined number of components (usually only one) have been dropped onto the picking surface.

According to an embodiment of the invention, the component feeder comprises a vibration device configured to vibrate the picking surface. The vibration device can be used to move the component on the picking surface, for example, to turn the components into a correct position. If a number of components are placed on the picking surface, the vibration device can be used to separate the components to enable localization of the components.

According to another aspect of the invention, this object is achieved by a system for picking components as defined in claim 12.

The system comprises a component feeder and an industrial robot including a robot controller and configured to pick components from the component feeder. The component feeder is a component feeder according to the invention, and the component feeder is configured to provide the robot controller with information about the locations of the components to be picked when the load device has detected that a component is present on the picking surface. The component feeder can either be configured to send the images including information about the locations of the components, or to send the determined locations, such as position and orientation of the components, to the robot controller.

According to an embodiment of the invention, the vision system of the component feeder comprises an image scanner, and the image scanner is directly connected to the robot controller.

According to an embodiment of the invention, the vision system of the component feeder comprises an image processing module configured to determine the locations of the components based on the images of the components, the image scanner is configured to send the determined locations of the components to the robot controller, and the robot controller is configured to direct the robot to pick the components based on the received locations from the image scanner.

According to an embodiment of the invention, the system comprises a conveyer arranged to feed components to the picking surface of the component feeder, and the system is configured to stop the conveyer after the load device has detected the presence of a predetermined number of components on the picking surface.

BRIEF DESCRIPTION OF THE DRAWINGS

The invention will now be explained more closely by the description of different embodiments of the invention and with reference to the appended figures.

DETAILED DESCRIPTION

Figure 1:
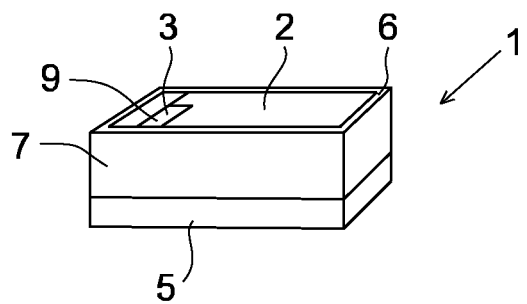
FIG. 1 illustrates schematically a component feeder according to an embodiment of the invention.

FIG. 1 illustrates schematically a component feeder 1 according to an embodiment of the invention. The component feeder comprises a stationary picking surface 2 for receiving components to be picked, and a vision system including an image unit 3 arranged to take images of components distributed on the picking surface 2. The vision system further comprises a load device 5 in the form of a load cell including one or more load sensors adapted to detect the presence of a component on the picking surface 2 and the vision system is configured to automatically trigger the image unit 3 to take an image upon detecting the presence of a component on the picking surface. In a preferred embodiment, as disclosed in FIG. 1, the picking surface 2 is transparent and the image unit 3 is disposed underneath the picking surface. However, in an alternative embodiment, the picking surface 2 can be opaque and the image unit 3 can be disposed above the picking surface.

In a preferred embodiment, as disclosed in FIG. 1, the vision system comprises an image scanner 7 and the picking surface and the image unit are parts of the image scanner. The image scanner is, for example, a high-speed 2D scanner. The image scanner comprises a glass plate 6 and the picking surface is an upper surface of the glass plate. In this embodiment, the image unit 3 is disposed underneath the picking surface, and the image unit 3 is arranged movable in relation to the transparent picking surface to allow scanning of components located on the picking surface. The component feeder 1 also comprises a movable light source 9 disposed underneath the picking surface 2. The image scanner illustrated in FIG. 1 is a flat-bed scanner, for example, a CCD scanner. The image unit is, for example, a CCD capture device. CCD-type scanners typically contain three rows (arrays) of sensors with red, green, and blue filters. In an alternative embodiment, the vision system may comprise a camera instead of the image scanner.

The image scanner may comprise a scanner head including a movable light sensor array and a movable light source. Actuation of the image scanner head may be done either by a pneumatic cylinder, or by conventional stepper-motor drive. To produce a 200 dpi, 8-bit greyscale image, a scan-time of around 0.1-0.2 seconds over a 200×130 mm area can be expected with a modern high-speed contact image sensor (CIS) imaging head. Execution of the vision job takes a further 80-100 milliseconds.

The load device is suitably adapted to measure the weight of the components placed on the picking surface. For example, the one or more load sensors are pressure sensors. In the embodiment disclosed in FIG. 1, the load device 5 is disposed underneath the image scanner 7 so that the one or more load sensors measure the weight of the image scanner 7 as well as the components on the picking surface. In an alternative embodiment, the load device is disposed underneath the glass plate 6 so that the one or more load sensors measure the weight of the glass plate as well as the components on the picking surface.

Figure 2:
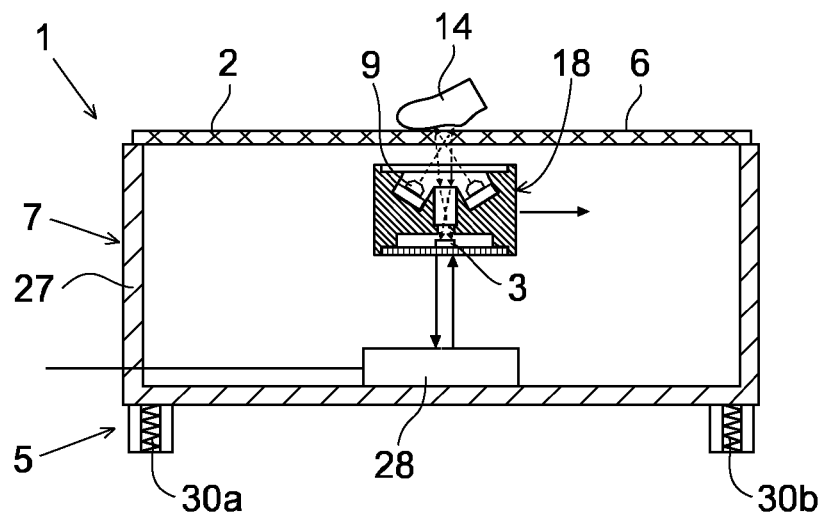
FIG. 2 illustrates schematically, in cross section, a component feeder according to an embodiment of the invention.

FIG. 2 schematically illustrates, in cross section, an example of a component feeder 1 according to the invention. The component feeder 1 comprises an image scanner 7 including a glass plate 6 having a transparent picking surface 2 upon which components 14 to be picked are present. The component feeder further comprises a vision system configured to locate the components distributed on the picking surface. The vision system comprises an image sensor scanner system 18 comprising an image unit 3 comprising an image sensor, and at least one movable light source 9, both located underneath the transparent picking surface 2. The image sensor scanner system 18 is linearly movable in relation to the picking surface 2 to allow scanning of the component on the picking surface. The image sensor scanner system 18 is linearly movable in parallel with the picking surface. In the illustrated embodiment, the image sensor scanner system 18 is a CIS (contact image sensor) scanner system. The CIS scanner system further comprises its usual components comprising a self-focusing rod lens array, and a photo detector array under the rod lens array and e.g. comprising a row of photodiodes. The light source 9 may comprise an illuminating strip of e.g. tricolour LED chips. The image scanner 7 comprises a housing 27 enclosing the image sensor scanner system 18. The image scanner 7 further comprises a scanner processor unit 28 for controlling the image sensor scanner system 18. In this embodiment, the scanner processor unit 28 is configured to receive the images from the image sensor scanner system 18 and to process the images received from the image sensor scanner system 18 and to determine the location, e.g. the position and orientation, of the components 14 on the picking surface 2 based on the images from the image sensor scanner system 18. The scanner processor unit 28 is further configured to send the determined locations of the components on the picking surface to a robot controller.

The illustrated CIS scanner system is only an example. There will exist other CIS scanner systems that would be suitable. For example, the illustrated CIS system is a single light CIS system, but also a dual light CIS system would be suitable.

The component feeder 1 further comprises a load device 5 including a plurality of load sensors 30*a-b* adapted to detect the presence of a component 14 on the picking surface 2 and to automatically trigger the image sensor scanner system 18 to take an image upon detecting the presence of the component 14 on the picking surface 2. A load sensor is a transducer that is used to create an electrical signal whose magnitude is directly proportional to the force being measured. The various types of load cells may include hydraulic load sensors, pneumatic load sensors, optical load sensors and strain gauge load sensors. Suitably, the load sensors are strain gauge sensors. A strain gauge sensor is cheap and can be used in this application. Alternatively, an optical load sensor can be used.

A strain gauge is a device used to measure strain on an object. A strain gauge takes advantage of the physical property of electrical conductance and it's dependent on the conductors geometry. When the strain gauge is compressed, its electrical resistance end-to-end will change. From the measured electrical resistance of the strain gauge, the amount of induced stress may be determined. A typical strain gauge includes a long, thin conductive strip in a zig-zag pattern of parallel lines such that a small amount of stress in the direction of the orientation of the parallel lines results in a multiplicatively larger strain measurement over the effective length of the conductor surfaces in the array of conductive lines.

In one embodiment, the component feeder is provided with a plurality of legs, typically three or four legs, for supporting the image scanner. The load sensors 30*a-b* are attached to the legs of the component feeder. Thus, the number of load sensors depends on the number of legs. In this embodiment, the load device comprises four load sensors (only two is seen in the figure) and the load sensors are strain gauges. In this embodiment, the load sensors are connected to the scanner processor unit 28, which is configured to receive measuring data from the load sensors 30*a-b*.

Figure 3:
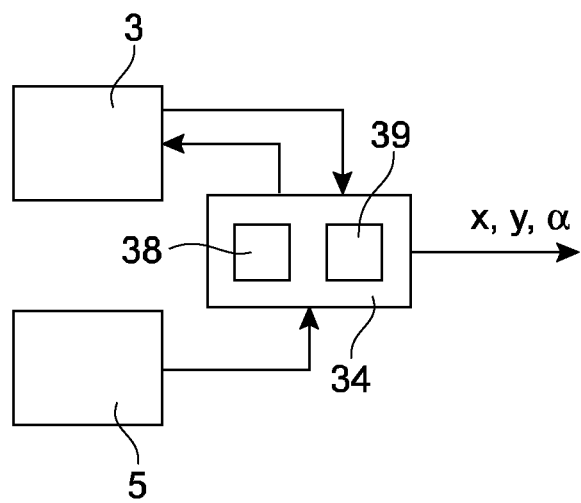
FIG. 3 shows a block diagram of an example of a vision system of a component feeder according to an embodiment of the invention.

FIG. 3 shows a block diagram of an example of a vision system of a component feeder according to an embodiment of the invention. The vision system comprises a load device, illustrated by block 5, including one or more load sensors producing measuring data, and an image unit 3 including one or more image sensors for providing images of components on a picking surface. The vision system further comprises a processor unit 34. The load device is configured to detect a change in load, for example a change in pressure, on a picking surface due to the fact that one or more components have been positioned on the picking surface. Measuring data from the load device is sent to the processor unit 34. For example, the processor unit 34 is the scanner processor unit 28 disclosed in FIG. 2. The processor unit 34 comprises an image control module 38 configured to detect when a component has been fed to the picking surface based on the values of the measuring data received from the load device. If the load device includes more than one load sensor, the values of measuring data from the load sensors are added. For example, the image control module is configured to detect a component by comparing the value of the received measuring data with a defined limit value. If the value of the measuring data is larger than the limit value, a component has been detected on the picking surface. The measuring data represents the load on the picking surface. A component is detected if the load on the picking surface is larger than a limit value. The image control module 38 may further be configured to determine the number of components on the picking surface by comparing the value of the received measuring data with a plurality of limit values representing different numbers of components. The image control module 38 may further be configured to determine the weight of the component on the picking surface.

The vision system further comprises an image processing module 39 configured to determine the locations of the components based on the images of the components distributed on the picking surface taken by the image unit 3. The image control module 38 and the image processing module 39 can be software modules executed by the processor unit 34. In this embodiment, the image processing module 39 is run on the same processor as the image control module 38, i.e. on the processor unit 34. If the image unit is an image scanner, the image control module 38 and the image processing module 39 can be software modules executed by the scanner processor unit 28. Thus, the image processing module 39 is embedded in the image scanner. In an alternative embodiment of the invention, the component feeder can be provided with a separate system processor in addition to the scanner processor. For example, the image processing module can be located on the robot controller and the image processing module can be executed by a processor in the robot controller.

When the image control module 38 detects the presence of a component on the picking surface 2, the processor unit 34 generates a trigger signal to the image unit 3, and the image unit generates an image of the picking surface and the component(s) on the picking surface. Thus, the image unit 3 is automatically triggered to take an image when the presence of a new component on the picking surface has been detected. The captured image is sent to the processor unit 34, which carries out the image processing of the image in order to determine the location, e.g. the position and orientation (x, y, a) of the component on the picking surface. The processor unit 34 sends the determined location of the component to a robot controller.

Figure 4:
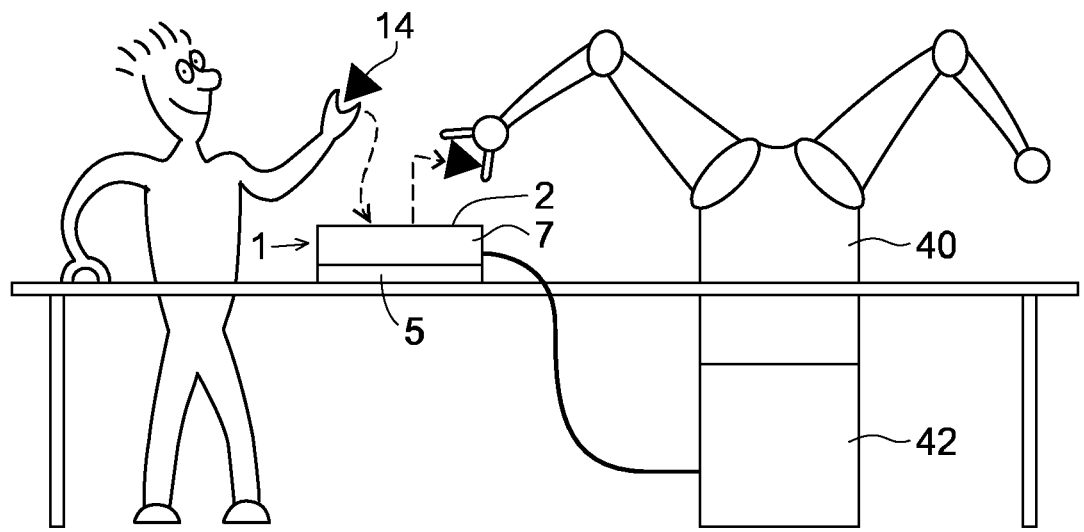
FIG. 4 shows a first example of a system for picking components comprising a component feeder unit and an industrial robot, and a human is feeding components to the component feeder.

FIG. 4 shows a first example of a system for picking components comprising a component feeder 1 according to the invention and an industrial robot 40 including a robot controller 42, and configured to pick components from a picking surface 2 of the component feeder. As seen from the figure, the picking surface is stationary arranged in relation to the environment and the robot. The robot controller 42 comprises hardware and software for controlling the robot 40. In this case, the image scanner 7 is connected directly to the robot controller 42 by e.g. an Ethernet connection. The component feeder 1 is configured to determine the location of a component 14 on the picking surface and to send its coordinates to the robot controller 42, when the component feeder has detected that a component is present on the picking surface. The robot controller directs the robot to pick the component. The system is suitable for collaborative human-robot assembly, as shown in FIG. 4. A human is then feeding components 14 to the component feeder, and the robot 40 picks the components from the picking surface 2 of the component feeder 1.

Figure 5:
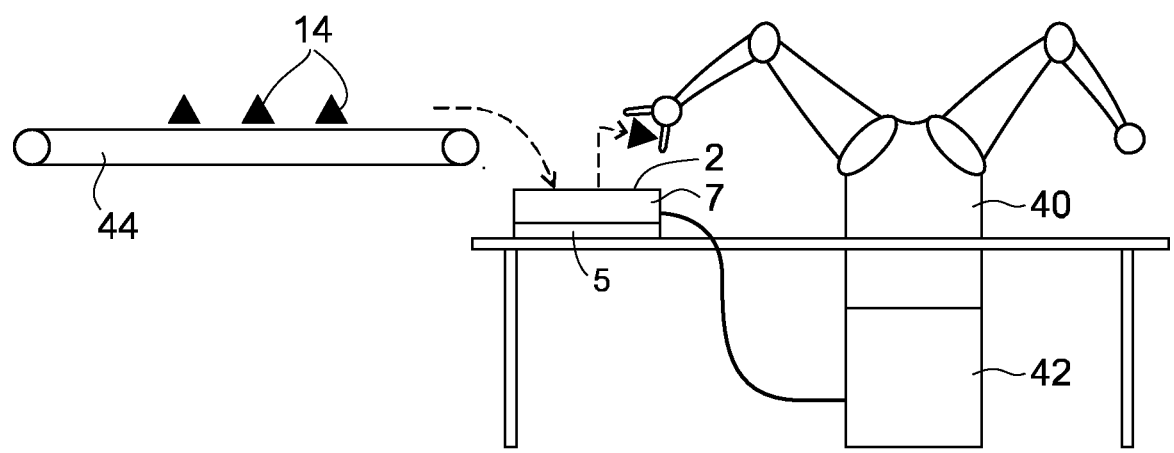
FIG. 5 shows a second example of a system for picking components comprising a component feeder, an industrial robot, and a conveyer is feeding components to the component feeder.

FIG. 5 shows another use of a component feeder according to the invention. In this example, the system for picking components comprises a component feeder 1 according to the invention, an industrial robot 40, and a conveyer 44 feeding components 14 of the component feeder. Here, the component feeder is used to receive components 14 that are fed from the conveyor 44. In this case the load-sensor is used to stop the conveyor after a predetermined number of components 14 (usually only one) have been dropped onto the picking surface 2.

A prerequisite, which is also the case with a camera-based solution, for finding components on the picking surface is that the human or conveyor places the components with the same surface facing downwards so that only affine (translation in XY plane plus rotation about Z-axis) transformations are required to match the current image with a trained image, e.g. if the components land, or are placed upside-down, the image system will not recognize them. The component feeder may comprise a vibration device configured to vibrate the picking surface. The vibration device can be used to move the component on the picking surface, for example, to turn the components into a correct position. If a number of components are placed on the picking surface, the vibration device can be used to separate the components to enable localization of the components. When the picking surface has been vibrated, a new image can be taken, and if it is still difficult to determine the localization of the component on the picking surface, the vibration can be repeated. Thus, vibration and taking new image can be repeated until a suitable position of the component(s) has been achieved.

The present invention is not limited to the embodiments disclosed but may be varied and modified within the scope of the following claims. For example, the image unit can be a camera or another type of sensor for producing an image of the component.

The invention claimed is:

1. A component feeder comprising:
   a picking surface for receiving components to be picked,
   an image unit arranged to take images of components distributed on the picking surface, and
   a load device including one or more load sensors adapted to detect the presence of a component on the picking surface, the load device being configured to automatically trigger the image unit to take an image upon detecting the presence of a component on the picking surface,
   wherein the picking surface is transparent and the image unit is located underneath the picking surface.

2. The component feeder according to claim 1, wherein the load device is adapted to measure the weight of the components placed on the picking surface.

3. The component feeder according to claim 2, wherein said one or more load sensors are pressure sensors.

4. The component feeder according to claim 1, wherein said one or more load sensors are pressure sensors.

5. The component feeder according to claim 1, further comprising an image scanner.

6. The component feeder according to claim 5, wherein the image scanner includes the image unit and a movable light source, the image unit being movable.

7. The component feeder according to claim 6, wherein the image scanner is a flat-bed scanner including a glass plate and the picking surface is formed by an upper surface of said glass plate.

8. The component feeder according to claim 5, wherein the image scanner is a flat-bed scanner including a glass plate, and the picking surface is formed by an upper surface of said glass plate.

9. The component feeder according to claim 5, further comprising an image processing module configured to determine the locations of the components based on the images of the components distributed on the picking surface, wherein the image processing module is embedded in the image scanner.

10. The component feeder according to claim 5, wherein said one or more load sensors are disposed underneath the image scanner so that said one or more load sensors measure the weight of the image scanner as well as the components on the picking surface.

11. The component feeder according to claim 1, wherein said one or more load sensors are strain gauge sensors.

12. The component feeder according to claim 1, wherein the component feeder includes a vibration device configured to vibrate the picking surface.

13. A system for picking components comprising:
a component feeder and an industrial robot having a robot controller and being configured to pick components from the component feeder, the component feeder including:
 a picking surface for receiving components to be picked,
 an image unit arranged to take images of components distributed on the picking surface, and
 a load device including one or more load sensors adapted to detect the presence of a component on the picking surface, the load device being configured to automatically trigger the image unit to take an image upon detecting the presence of a component on the picking surface; and
the component feeder configured to provide the robot controller with information about locations of the components to be picked when the component feeder has detected that a component is present on the picking surface,
wherein the picking surface is transparent and the image unit is located underneath the picking surface.

14. The system for picking components according to claim 13, wherein the system includes a conveyer arranged to feed components to the picking surface, and the system is configured to stop the conveyer after the load device has detected the presence of a predetermined number of components on the picking surface.

15. The system for picking components according to claim 13, wherein the component feeder includes an image processing module configured to determine the locations of the components based on the images of the components and send the determined locations of the components to the robot controller, and wherein the robot controller is configured to direct the robot to pick the components based on the received locations.

16. The system for picking components according to claim 13, wherein the component feeder includes an image scanner, and the image scanner is directly connected to the robot controller.

17. The system for picking components according to claim 16, wherein the component feeder includes an image processing module configured to determine the locations of the components based on the images of the components send the determined locations of the components to the robot controller, and wherein the robot controller is configured to direct the robot to pick the components based on the received locations.

18. A component feeder comprising:
 a picking surface for receiving components to be picked,
 an image scanner,
 an image unit arranged to take images of components distributed on the picking surface, and
 a load device including one or more load sensors adapted to detect the presence of a component on the picking surface, the load device being configured to automatically trigger the image unit to take an image upon detecting the presence of a component on the picking surface,
wherein said one or more load sensors are disposed underneath the image scanner so that said one or more load sensors measure the weight of the image scanner as well as the components on the picking surface.

19. The component feeder according to claim 18, wherein the load device is adapted to measure the weight of the components placed on the picking surface.

20. The component feeder according to claim 18, wherein the image scanner includes the image unit and a movable light source, the image unit being movable.

* * * * *